United States Patent
Higuchi et al.

(10) Patent No.: US 10,594,880 B2
(45) Date of Patent: Mar. 17, 2020

(54) LOCK LEVER STRUCTURE, UNIT, AND IMAGE FORMING APPARATUS

(71) Applicants: Sakie Higuchi, Tokyo (JP); Yuki Sato, Kanagawa (JP); Shiro Akama, Tokyo (JP); Tsuyoshi Endo, Kanagawa (JP); Tsutomu Osawa, Tokyo (JP); Yuta Ueda, Kanagawa (JP)

(72) Inventors: Sakie Higuchi, Tokyo (JP); Yuki Sato, Kanagawa (JP); Shiro Akama, Tokyo (JP); Tsuyoshi Endo, Kanagawa (JP); Tsutomu Osawa, Tokyo (JP); Yuta Ueda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 635 days.

(21) Appl. No.: 15/369,452

(22) Filed: Dec. 5, 2016

(65) Prior Publication Data
US 2017/0163827 A1 Jun. 8, 2017

(30) Foreign Application Priority Data
Dec. 8, 2015 (JP) ................................. 2015-239571

(51) Int. Cl.
*H04N 1/00* (2006.01)
*E05B 65/00* (2006.01)

(52) U.S. Cl.
CPC ....... *H04N 1/00554* (2013.01); *E05B 65/006* (2013.01); *H04N 1/00538* (2013.01);
(Continued)

(58) Field of Classification Search
CPC ......... Y10T 292/1039; Y10T 292/1041; Y10T 292/104; Y10T 292/1077; Y10T 292/108;
(Continued)

(56) References Cited

U.S. PATENT DOCUMENTS

| 701,238 A | * | 5/1902 | Williams ............ E05B 65/0864 292/61 |
| 1,844,262 A | * | 2/1932 | Pierson ..................... B07B 1/46 220/318 |

(Continued)

FOREIGN PATENT DOCUMENTS

| JP | 4-366966 | 12/1992 |
| JP | 8-202236 | 8/1996 |

(Continued)

OTHER PUBLICATIONS

Japanese Office Action; Application 2015-239571; dated Aug. 20, 2019.

*Primary Examiner* — Carlos Lugo
*Assistant Examiner* — Faria F Ahmad
(74) *Attorney, Agent, or Firm* — Duft & Bornsen, PC

(57) ABSTRACT

A lock lever structure includes a shaft; a cam attached to the shaft to fit a different-shaped portion of the shaft to prevent rotation of the cam in a circumferential direction of the shaft, the different-shaped portion having a different shape in cross section from a round portion of the shaft; a lever having an inner hollow cylindrical portion larger than an outline of the shaft and attached to the shaft to be rotatable in the circumferential direction of the shaft; a spring attached to the shaft to press the cam and the lever in an axial direction of the shaft; and a retainer attached to the shaft to retain the spring, the cam, and the lever to the shaft. The cam has at least two valley portions. The lever has a contact portion to contact the cam. The contact portion has a base shape.

9 Claims, 4 Drawing Sheets

(52) U.S. Cl.
CPC ... *H04N 2201/0094* (2013.01); *Y10T 292/104* (2015.04); *Y10T 292/108* (2015.04); *Y10T 292/1039* (2015.04); *Y10T 292/1041* (2015.04); *Y10T 292/1077* (2015.04)

(58) Field of Classification Search
CPC ..... E05B 65/006; B41J 25/34; B41J 2/17593; H04N 1/00554; H04N 1/00538; H04N 2201/0094; G03G 15/0841; G03G 15/0886
USPC .... 292/DIG. 11, DIG. 63, DIG. 53, DIG. 20, 292/DIG. 47
See application file for complete search history.

(56) References Cited

U.S. PATENT DOCUMENTS

| | | | | |
|---|---|---|---|---|
| 1,907,625 A * | 5/1933 | Vogt | E05B 65/0864 | 292/140 |
| 1,945,155 A * | 1/1934 | Moore | E05B 83/243 | 292/202 |
| 1,945,156 A * | 1/1934 | Moore | E05B 83/243 | 292/202 |
| 2,203,845 A * | 6/1940 | Sletten | E05B 85/24 | 292/220 |
| 2,235,949 A * | 3/1941 | Shaw | E05F 11/00 | 24/590.1 |
| 2,389,184 A * | 11/1945 | Cooke | B23Q 3/00 | 235/62 F |
| 4,113,221 A * | 9/1978 | Wehner | A47C 3/34 | 248/408 |
| 4,127,291 A * | 11/1978 | Pelcin | E05B 83/10 | 292/218 |
| 4,671,547 A * | 6/1987 | Weinerman | E05C 3/042 | 292/197 |
| 4,702,095 A * | 10/1987 | Ben-Asher | E05B 47/023 | 292/201 |
| 4,801,164 A * | 1/1989 | Mosch | E05C 3/046 | 292/204 |
| 4,813,726 A * | 3/1989 | Ravinet | A47B 95/00 | 292/204 |
| 5,234,236 A * | 8/1993 | Gromotka | E05B 63/0056 | 292/194 |
| 5,688,003 A * | 11/1997 | Beale | E05C 3/10 | 292/202 |
| 5,741,032 A * | 4/1998 | Chaput | E05B 65/0811 | 292/202 |
| 6,073,792 A * | 6/2000 | Campbell | B65D 50/067 | 220/210 |
| 6,123,373 A * | 9/2000 | Yoshida | E05C 3/06 | 292/197 |
| 6,705,650 B2 * | 3/2004 | Ohnishi | F02M 35/0203 | 292/242 |
| 6,868,590 B2 * | 3/2005 | Bentrim | F16B 5/0642 | 24/458 |
| 7,165,427 B1 * | 1/2007 | Lai | E05B 63/0013 | 292/153 |
| 7,578,578 B2 * | 8/2009 | Akahane | B41J 2/2135 | 347/49 |
| 7,712,343 B2 * | 5/2010 | Smith | E05B 13/004 | 292/359 |
| 7,980,519 B2 * | 7/2011 | Chen | A47B 9/14 | 135/140 |
| 8,403,458 B2 * | 3/2013 | Montfort | B41J 25/34 | 347/40 |
| 8,608,394 B2 * | 12/2013 | Ando | G03G 21/1633 | 399/114 |
| 8,777,279 B2 * | 7/2014 | Kothy | E05B 17/2084 | 292/137 |
| 8,789,857 B2 * | 7/2014 | Liang | E05B 17/2019 | 292/111 |
| 8,807,607 B2 * | 8/2014 | Glickman | E05C 3/046 | 292/241 |
| 9,091,293 B1 * | 7/2015 | Tseng | F16B 5/0208 | |
| 9,190,819 B2 * | 11/2015 | Jones | H02G 3/081 | |
| 2002/0060456 A1 * | 5/2002 | Linares | E05C 3/145 | 292/103 |
| 2002/0167181 A1 * | 11/2002 | Chiang | E05B 1/0092 | 292/202 |
| 2004/0056488 A1 * | 3/2004 | Jackson, Jr. | E05B 17/0025 | 292/66 |
| 2005/0008393 A1 * | 1/2005 | Kuma | G03G 21/1633 | 399/110 |
| 2005/0161955 A1 * | 7/2005 | Hicok | E05B 65/006 | 292/240 |
| 2006/0087130 A1 * | 4/2006 | Liang | E05B 17/208 | 292/242 |
| 2007/0120374 A1 * | 5/2007 | Cotton | E05B 1/0092 | 292/66 |
| 2007/0160383 A1 * | 7/2007 | Matsumoto | G03G 15/751 | 399/110 |
| 2009/0072548 A1 * | 3/2009 | Yang | B60R 11/0235 | 292/98 |
| 2011/0123217 A1 * | 5/2011 | Matsui | G03G 21/1633 | 399/107 |
| 2013/0322925 A1 | 12/2013 | Fujii | | |
| 2014/0099155 A1 * | 4/2014 | Chen | E04H 15/46 | 403/83 |
| 2019/0045651 A1 * | 2/2019 | Ehlen | H05K 7/1427 | |

FOREIGN PATENT DOCUMENTS

| | | |
|---|---|---|
| JP | H10220550 A | 8/1998 |
| JP | 2000314992 A | 11/2000 |
| JP | 2002-258562 | 9/2002 |
| JP | 2002-287447 | 10/2002 |
| JP | 2005240971 A | 9/2005 |
| JP | 2006-015495 | 1/2006 |
| JP | 2007-093642 | 4/2007 |
| JP | 2009-157042 | 7/2009 |
| JP | 2010-001087 | 1/2010 |
| JP | 2011-013303 | 1/2011 |
| JP | 2012-118171 | 6/2012 |
| JP | 2014157378 A | 8/2014 |
| JP | 2015009944 A | 1/2015 |

* cited by examiner

LOCK LEVER STRUCTURE, UNIT, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2015-239571, filed on Dec. 8, 2015, in the Japan Patent Office, the entire disclosure of which is hereby incorporated by reference herein.

BACKGROUND

Technical Field

Embodiments of the present disclosure relate to a unit constituting part of an apparatus, an image forming apparatus detachably including the unit in a replaceable manner, and a lock lever structure usable in the unit and the image forming apparatus.

Related Art

For a multifunction peripheral (MFP which, in the present specification, mainly refers to an image forming apparatus having two or more functions of a copier, a printer, a facsimile machine, and the like), a photoconductor unit (PCU which is referred to as a PCU unit in the present specification) is typically replaced by a service person. The PCU unit is often screwed to a body of the MFP. However, a machine including a PCU unit assumed to be replaced by a user is required to have a configuration in which the PCU unit is replaceable without any tool. For example, a lock lever system operable by a hand is known as an effective system having the above-described configuration.

SUMMARY

In one aspect of the present disclosure, there is provided a lock lever structure that includes a shaft, a cam, a lever, a spring, and a retainer. The cam is attached to the shaft to fit a different-shaped portion of the shaft to prevent rotation of the cam in a circumferential direction of the shaft. The different-shaped portion has a different shape in cross section from a round portion of the shaft. The lever has an inner hollow cylindrical portion larger than an outline of the shaft. The lever is attached to the shaft to be rotatable in the circumferential direction of the shaft. The spring is attached to the shaft to press the cam and the lever in an axial direction of the shaft. The retainer is attached to the shaft to retain the spring, the cam, and the lever to the shaft. The cam has at least two valley portions. The lever has a contact portion to contact the cam. The contact portion has a base shape.

In another aspect of the present disclosure, there is provided a unit including the lock lever structure. The unit is detachably attached to an image forming apparatus.

In still another aspect of the present disclosure, there is provided an image forming apparatus including the unit. The unit is detachable from the image forming apparatus in a replaceable manner.

In still yet another aspect of the present disclosure, there is provided an image forming apparatus including the lock lever structure.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
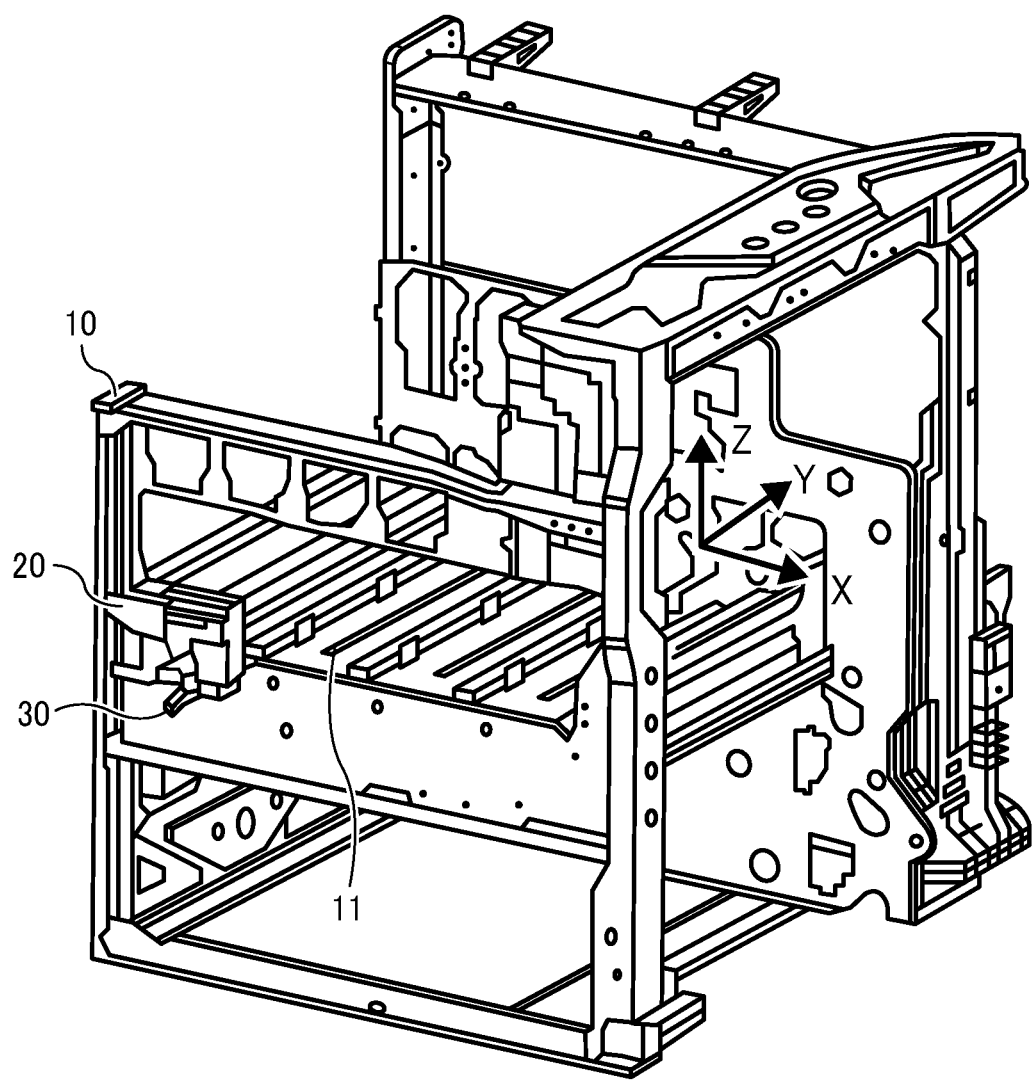
FIG. 1 is a perspective view for illustrating a relationship between a PCU unit of an image forming apparatus and a structural body according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. In the drawings for explaining the following embodiments, the same reference codes are allocated to elements (members or components) having the same function or shape and redundant descriptions thereof are omitted below.

A lock lever structure according to at least one embodiment of the present disclosure has a structure pressing a PCU unit, which is a unit constituting part of an image forming apparatus, and has the following characteristics. For example, a cam has at least two valleys and two mountains, and a lever is guided to a lock position or a retreat position even if a hand is released from the lever at any angle when the PCU unit is not attached. Accordingly, when the PCU unit is detached and replaced, the lock lever structure can reliably guide the PCU unit to the retreat position, thus enhancing the operability.

An embodiment of the present disclosure is described below with reference to the drawings. FIG. 1 is a perspective view of a relationship between a PCU unit 20 of an image forming apparatus and a structure in the present embodiment. The PCU unit 20 of the image forming apparatus is in a positional relationship illustrated in FIG. 1 relative to a body structure 10. For example, as a method of supporting the PCU unit 20 in a direction indicated by arrow X, a side shape of a rail 11 and a side shape of the PCU unit 20 are fitted with each other. As a method of supporting the PCU unit 20 in a direction indicated by arrow Y, the PCU unit 20 is pressed against the body structure 10 by a lock lever 30.

As a method of supporting the PCU unit 20 in a direction indicated by arrow Z, the PCU unit 20 is disposed on the rail 11.

Figure 2:
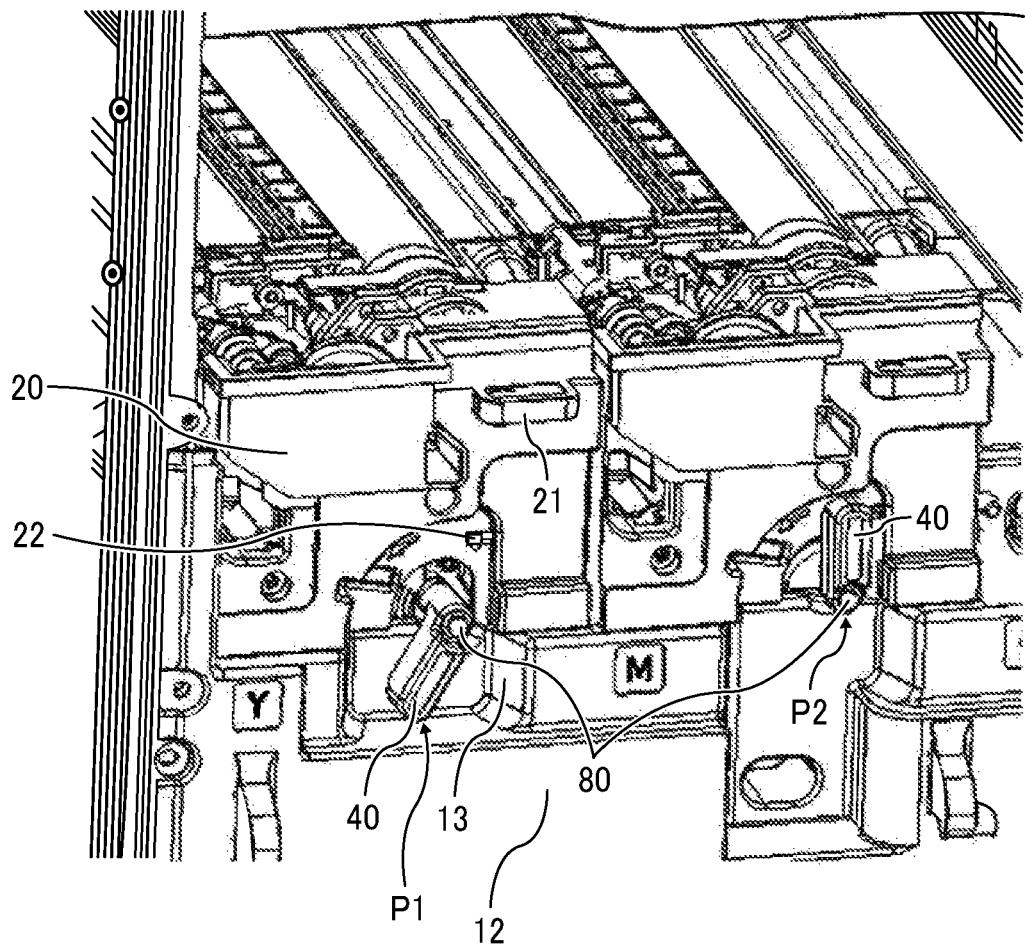
FIG. 2 is a diagram of a relationship between a lock lever, the PCU unit, and a periphery of the lock lever and the PCU unit according to an embodiment of the present disclosure.

FIG. 2 is a diagram of a relationship between the lock lever, the PCU unit, and a periphery of the lock lever and the PCU unit. A lever 40 of the lock lever 30 has a retreat position (an unlock position: a state P1 of the lever 40 illustrated in FIG. 2) and a lock position (a state P2 of the lever 40 illustrated in FIG. 2). When the PCU unit 20 is detached or attached, the lever 40 is used in the retreat position, and when the PCU unit 20 is secured on the body structure 10, the lever 40 is used in the lock position. When the lock lever 30 is in the retreat position, the PCU unit 20 can be drawn out in a forward direction by pinching a tab 21 of the PCU unit 20.

When only the lock lever 30 is mounted to the body structure 10, the lever 40 rotates by 360° in a circumferential direction of a shaft. However, as illustrated in FIG. 2, a projection is disposed to prevent the lever 40 from rotating to the outside of a supposed range in a state in which the PCU unit 20 is mounted to the body structure 10.

In addition, for such a configuration, when the lever 40 of the lock lever 30 is not in the lock position, the lever 40 interferes with an exterior cover to prevent closing of the exterior cover, thus preventing the mounting of the lever 40 from becoming a so-called "unworkable state". In other words, when the PCU unit 20 is inserted into the body structure 10, a projection 22 as a stopper of the PCU unit 20 prevents the lever 40 from further rotating beyond the lock position in a clockwise direction illustrated in FIG. 2. In addition, when the lever 40 is rotated to or beyond the retreat position in a counterclockwise direction illustrated in FIG. 2, the lever 40 contacts a wall 13 as a stopper of an inner cover 12 and becomes unable to further rotate. By providing such stoppers having shapes against a rotation direction of the lever 40 in a peripheral unit, the lever 40 and other members are prevented from being damaged even if large force is applied.

Figure 3:
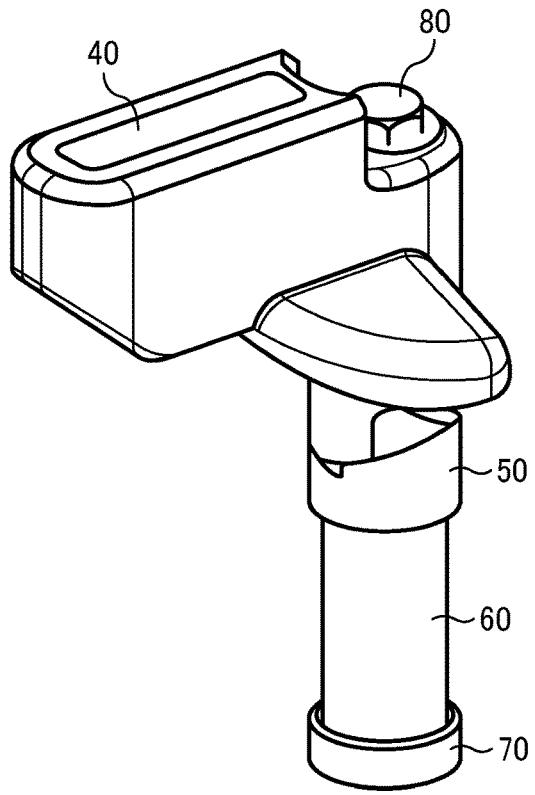
FIG. 3 is a diagram of a configuration of the lock lever according to an embodiment of the present disclosure.

FIG. 3 is a diagram of a configuration of the lock lever. As illustrated in FIG. 3, the lock lever 30 includes the lever 40, a cam 50, a spring 60, a shaft 70, and a retainer 80. The spring 60, the cam 50, and the lever 40 are attached to the shaft 70, and retained by the retainer 80 so as not to be detached from the shaft 70. The cam 50 and the lever 40 are pressed by the spring 60 in an axial direction of the shaft 70. In FIG. 3, the retainer 80 is a screw attached to the lever 40. However, the retainer is not limited to the screw. In some embodiments, for example, the lever 40 may have a snap fit as the retainer.

Figure 4:
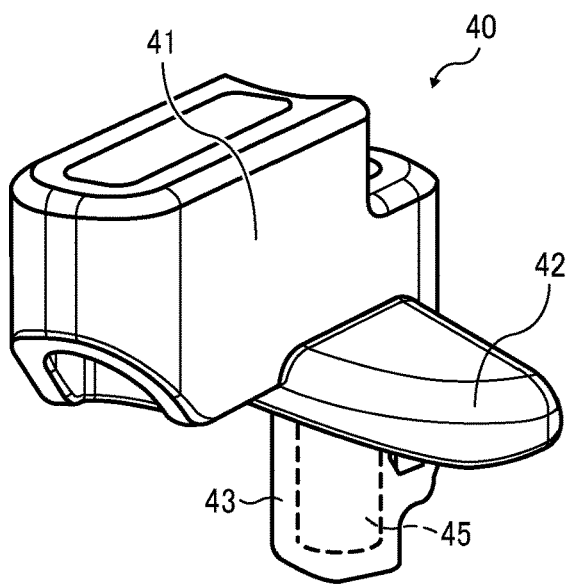
FIG. 4 is a diagram of a configuration of a lever according to an embodiment of the present disclosure.

FIG. 4 is a diagram of a configuration of the lever 40. As illustrated in FIG. 4, the lever 40 includes a grip 41 and a pressing portion 42 to press the PCU unit 20 against the body structure 10. A contact portion 43 to contact the cam 50 has a base shape. An inner hole (hollow cylindrical portion) 45 of the lever 40 is larger than an outline of the shaft 70. Thus, the lever 40 is rotatable by 360° in the circumferential direction.

Figure 5:
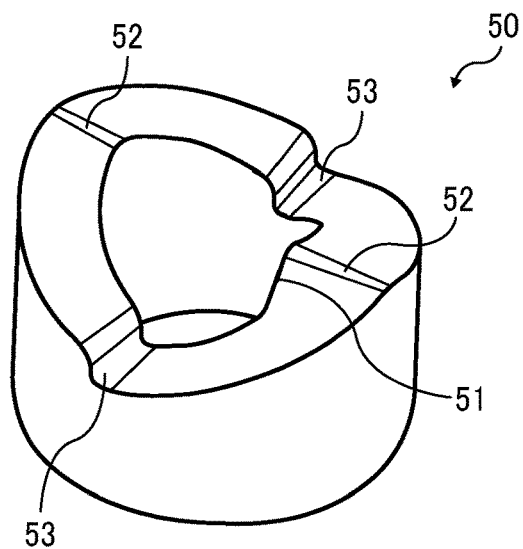
FIG. 5 is a diagram of a configuration of a cam according to an embodiment of the present disclosure.

FIG. 5 is a diagram of a configuration of the cam 50. As illustrated in FIG. 5, the cam 50 includes a rotation detent portion 51 and at least two mountain portions 52. The rotation detent portion 51 fits the shaft 70 so as not to rotate around the shaft 70. In addition, the cam 50 includes at least two valley portions 53 each acting as a clearance portion to prevent a head being a vertex of the contact portion 43 from bumping into a bottom of a valley. Such a configuration prevent the abrasion of the base shape.

Figure 6:
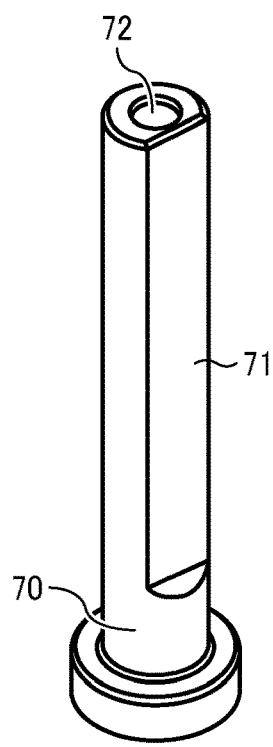
FIG. 6 is a diagram of a configuration of a shaft according to an embodiment of the present disclosure.

FIG. 6 is a diagram of a configuration of the shaft 70. As illustrated in FIG. 6, the shaft 70 includes a cutout portion 71 having a different shape to fit the rotation detent portion 51 of the cam 50, and a fitting portion 72 having a shape to prevent detachment. In the example illustrated in FIG. 6, the cutout portion 71 has a shape of so-called D-cut shaft. However, in some embodiments, the cutout portion 71 may have any shape and structure if the shape can stop the rotation of the cam 50, and the shape is not limited to the example illustrated in FIG. 6.

In the above-described configuration, the lever 40 is normally at rest in a position sandwiched by the slopes of the two mountain portions 52 of the cam 50. In addition, when the lever 40 is rotated in the circumferential direction with the grip 41 of the lever 40, as the mountain portions 52 rise in a height direction in FIG. 3, the cam 50 moves downward in the axial direction of the shaft 70, so that the spring 60 is compressed. Thus, the operating force gradually increases.

The lever 40 receives force in the axial direction from the spring 60. Thus, even if a hand is released at any angle in the circumferential direction, the lever 40 slides on the slope of the cam 50 and returns to the position sandwiched by the slopes of the mountain portions 52. In other words, even if a hand is released anywhere, the lever 40 returns to either of the valleys of the cam 50. Thus, the lever 40 can be reliably guided.

It is preferable to use a material having good slidability for or apply lubricant, such as grease, to contact surfaces of the lever 40 and the cam 50 and contact surfaces of the lever 40 and the shaft 70. Alternatively, in some embodiments, a configuration may be employed in which each pair of the contact surfaces of the lever 40 and the cam 50 and the contact surfaces of the lever 40 and the shaft 70 has a recess and a projection that do not fit each other. Any of the above-described configurations can enhance the slidability of the contact surfaces.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

For example, the above-described apparatus described as MFP is not limited to an apparatus relating to image formation. The term "image forming apparatus" is not intended to limit the subject of the present disclosure and appended claims to an apparatus having at least one function of a copier, a printer, and a facsimile machine.

What is claimed is:
1. A lever structure comprising:
a shaft having an exterior cross section shape that includes
a round portion and a non-round portion;
a cam attached to the shaft to fit the non-round portion of
the shaft to prevent rotation of the cam in a circumferential direction of the shaft;
a lever having an inner hollow cylindrical portion larger
than an exterior perimeter of the shaft, the lever
attached to the shaft to be rotatable in the circumferential direction of the shaft;
a spring attached to the shaft to press the cam and the lever
in an axial direction of the shaft; and a retainer attached to the shaft to retain the spring, the cam, and the lever to the shaft, the cam having at least two valley portions, the lever having a contact portion to contact the cam.

2. The lever structure according to claim 1, wherein the at least two valley portions of the cam have a clearance portion not contacted by a vertex of the base shape of the lever.

3. The lever structure according to claim 1, wherein contact surfaces of the lever and the cam and contact surfaces of the lever and the shaft are made of material configured to slide.

4. The lever structure according to claim 1, further comprising lubricant applied to contact surfaces of the lever and the cam and contact surfaces of the lever and the shaft.

5. The lever structure according to claim 1, further comprising a stopper to interfere with an exterior cover to prevent closing of the exterior cover when the lever is not in a lock position.

6. The lever structure according to claim 5, wherein the stopper is disposed in a periphery of the cam and the lever.

7. A unit comprising:
the lever structure according to claim 1,
wherein the unit is detachably attached relative to an image forming apparatus.

8. An image forming apparatus comprising:
the unit according to claim 7,
wherein the unit is detachable from the image forming apparatus in a replaceable manner.

9. An image forming apparatus comprising the lever structure according to claim 1.

* * * * *